United States Patent [19]

Melotik

[11] Patent Number: 5,082,311
[45] Date of Patent: Jan. 21, 1992

[54] PASSIVE IMPACT RESTRAINING VEHICULAR STEERING COLUMN ASSEMBLY

[75] Inventor: Joseph J. Melotik, Union Lake, Mich.

[73] Assignee: Ford Motor Company, Dearborn, Mich.

[21] Appl. No.: 591,178

[22] Filed: Oct. 1, 1990

[51] Int. Cl.$^5$ .............................................. B62D 1/18
[52] U.S. Cl. ................................... 280/777; 188/371
[58] Field of Search ......................... 280/777, 779, 780; 188/371, 374, 375, 376, 377; 74/492

[56] References Cited

U.S. PATENT DOCUMENTS

| | | | |
|---|---|---|---|
| 3,415,140 | 4/1967 | Bien et al. | 74/492 |
| 3,703,106 | 11/1972 | Arntson et al. | 74/492 |
| 3,769,851 | 11/1973 | Edme | 188/371 |
| 3,945,662 | 3/1976 | Murase | 74/492 |
| 4,000,876 | 1/1977 | Usui et al. | 248/205 |
| 4,022,495 | 5/1977 | Pizzocri | 280/750 |
| 4,098,141 | 7/1978 | Yamaguchi | 74/492 |
| 4,194,411 | 3/1980 | Manabe et al. | 74/492 |
| 4,228,695 | 10/1980 | Trevisson et al. | 74/492 |
| 4,274,299 | 6/1981 | Jones | 74/492 |
| 4,325,268 | 4/1982 | Benteler | 74/492 |
| 4,703,669 | 11/1987 | Hyodo | 74/492 |
| 4,786,076 | 11/1988 | Wierschem | 280/777 |
| 4,838,576 | 6/1989 | Hamasaki et al. | 280/777 |
| 4,943,028 | 7/1990 | Hoffmann | 74/492 |
| 4,949,992 | 8/1990 | Abramczyk | 280/777 |

Primary Examiner—Charles A. Marmor
Assistant Examiner—Karin Tyson
Attorney, Agent, or Firm—Daniel M. Stock; Clifford L. Sadler

[57] ABSTRACT

A passive impact energy absorbing collapsible steering column assembly including a main support bracket fixed at its base to the steering column body and having side members extending in the direction of the steering column and disposed on opposite sides of the steering column. Each side member including a guide slot bifurcating the side member into separate side rail portions, one of which constitutes a guide rail and the other constituting an impact energy absorbing side rail. A bolt is passed through each guide slot to secure the main support bracket to a support structure and is of a diameter greater than the width of the guide slot thereby offering resistance through bending deformation of the energy absorbing side rail portion to the collapse of the steering column body throughout the period of sustained impact. Each side member including a tapered transition portion immediately adjacent the initial frictional clamping position of bolt which allows immediate release of any frictional clamping resistance upon initial collapse of the steering column body relative to the support structure and main support bracket. The bolt further providing an axis upon which the steering column body may be tilted in the event of sustaining impact load having a vertical force vector exceeding a predetermined magnitude.

14 Claims, 3 Drawing Sheets

PASSIVE IMPACT RESTRAINING VEHICULAR STEERING COLUMN ASSEMBLY

TECHNICAL FIELD

This invention relates to steering column assemblies, particularly for vehicles having a passive impact restraining collapsible steering system.

BACKGROUND OF THE INVENTION

The present invention is directed to a collapsible energy absorbing steering column assembly which, upon impact from the occupant-driver, as may occur during a collision of considerable magnitude, allows an added degree of safety to the occupant. It is designed to axially collapse upon receiving an impact load from the occupant of a predetermined magnitude. Such systems are in common use today and may or may not be used in conjunction with an air bag which would inflate instantaneously upon impact and act as a barrier between the occupant and the steering wheel and other vehicle structures within the passenger compartment.

Such systems may include a steering column assembly which is designed to yield within itself, i.e., a "tube-in-tube" construction wherein the steering column and steering shaft are each of two-piece concentrically arranged construction allowing one section to telescopically fold within the other section. Alternatively, the steering column body can be a one-piece construction with the steering shaft itself being designed to yield, such as by bending. The steering shaft may be of one-piece construction from the steering wheel to the steering gear box, or it may be of multiple piece construction with U-joints in between the separate pieces.

Examples of such systems include the tube-in-tube steering column assembly shown in U.S. Pat. No. 3,415,140 wherein it is noted that the collapsible steering column body and internal steering column assembly is secured to a support structure by means of a support bracket which is held to the support structure solely by means of a frictional clamping arrangement. Once the friction of the fastening means is overcome by the impact load, the collapsible steering column assembly is released from all clamping engagement with the support structure. No means is provided for accommodating the possibility of vertical displacement of the steering wheel and absorbing the energy of any vertical displacement in a controlled manner. Further, because of the uncertainties provided in a pure friction clamping arrangement, the point at which the steering column assembly will be released from the support structure may vary over a fairly wide range of impact loads, and it will vary at each point of securement.

U.S. Pat. No. 4,098,141 is directed to the same type of system as shown in U.S. Pat. No. 3,415,140 but, by provision of a Teflon washer between the support bracket and support structure, seeks to eliminate the variance of any frictional clamping inconsistencies. Upon release, the collapse of one steering tube within the other is controlled by metal deformation upon the initial release of shear pins holding the two tube sections fixed to one another.

Other systems exist wherein the energy absorbing characteristics of the system are designed solely within the support bracket itself with the energy absorption capabilities being a combination of friction and metal deformation such as shown in U.S. Pat. No. 4,838,576 or pure metal deformation as shown in U.S. Pat. No. 4,703,669. In the latter disclosure, the support bracket allows for vertical displacement and energy absorption in the generally vertical direction.

Finally, there is that general class of collapsible energy absorbing steering column assemblies wherein the energy absorption characteristics are included in the mounting bracket, either solely or primarily, which secures the steering column body to the vehicle support structure and which includes (i) impeding the collapse of the steering column assembly by the bolt torque friction created between the mounting bolt securing the support bracket to the support structure, and (ii) controlled, or at least semi-controlled, deformation of the mounting bracket itself. Disclosures showing such systems are seen in U.S. Pat. Nos. 4,194,411; 4,022,495; 4,228,695; and 4,786,076.

In certain instances, the mounting bolts also serve as guide pins for guiding the axial collapse of the steering column assembly, such as shown in U.S. Pat. Nos. 4,022,495; 4,228,695; and 4,786,076. Further, in aforementioned U.S. Pat. Nos. 4,228,695 and 4,194,411, the mounting bracket is seen to accommodate vertical displacement of the steering wheel as well as axial displacement.

However, in none of the aforementioned systems is there provided a collapsible energy absorbing steering column assembly wherein the mounting bolt torque friction is completely eliminated from the function of absorbing energy upon axial displacement or throughout the entire axial displacement of the steering column assembly.

Further, none of the prior art systems provide a simple and economically designed support bracket providing: (i) a reliable guide for controlling axial displacement by pure bending deformation, (ii) eliminating lateral displacement and the uncertainties it causes in the controlled energy absorbing axial displacement of the steering column assembly, and (iii) permitting a limited degree of vertical displacement of the steering wheel assembly while absorbing the impact energy of such a vertical displacement.

The system shown in U.S. Pat. No. 4,000,876 is an example of an energy absorbing steering column support bracket providing for axial displacement of the steering column assembly without first having to overcome any frictional forces caused by positive torque mounting. On the other hand, the system does not include any positive torque mounting of any kind and, because of its being mounted within a pair of resilient sleeves, it is subject to constant floating and passing vibrations from the vehicle suspension through to the driver's hands.

SUMMARY OF THE INVENTION

The present invention includes an energy absorbing collapsible steering column assembly having the above-mentioned attributes.

It further includes a steering column support bracket assembly capable or adaptable to a wide range of uses with both a tube-in-tube type collapsible steering column assembly and a rigid one-piece non-collapsible steering column assembly axially yieldable by other means.

The present invention further includes a support bracket for the steering column assembly which is held rigid to the support structure by a positive compression-type clamping member and wherein any frictional force of the clamping member which might resist axial displacement of the steering column assembly is immediately released upon the steering column assembly being subjected to an impact of a predetermined magnitude.

The present invention is further directed to a collapsible steering column assembly support bracket which, in combination with the clamping member, is guided in a fixed axial direction inhibiting lateral displacement of the steering column body.

The present invention further includes a steering column assembly support bracket wherein the energy to be absorbed during the axial collapse of the steering column assembly is absorbed by pure bending deformation of the support bracket, and wherein the rate of energy absorption is closely controlled by the design of the support bracket, and may be varied by careful selection of those design features which determine the rate of bending deformation.

Further, the present invention provides a support bracket having the aforesaid attributes which further allows the support bracket to yield along an axis lateral to that of the steering column assembly, thus allowing vertical displacement of the steering column assembly and absorption of energy by pure bending deformation during such vertical displacement.

More specifically, the present invention includes a vehicle energy absorbing steering column assembly comprising a vehicle energy absorbing steering column assembly, a steering column body, a steering shaft rotatably supported within the steering column body and adapted to receive a steering wheel at one end and to engage a steering gear mechanism at its other end. An energy absorbing main support member is affixed to the steering column and adapted to support the steering column from the vehicle dashboard support structure. The main support member provides a means for (i) allowing the steering column to collapse forwardly along a fixed axial path in the event of an impact of predetermined magnitude upon the steering wheel in the direction of the front of the vehicle, and (ii) absorbing the energy of such impact solely by plastic deformation of the support member. The main support member further constitutes the sole support means for supporting the steering column beyond the point of any initial axial collapse of the steering column body.

Further, the present invention includes a support bracket member for fixing a steering column within a vehicle structure which includes a support bracket member comprising a generally U-shaped bracket having a base portion and two side portions disposed on opposite ends of the base. The base portion is disposed in a first plane substantially perpendicular to the axis of the steering column and constitutes a support for said steering column. The side portions are disposed in a second plane substantially perpendicular to the base portion, and each side portion includes a slot defined by oppositely disposed side rails. The slot is sufficiently wide at the end nearest the base to allow a guide pin to pass therethrough, the remainder of the slot being of a width less than the guide pin. One side rail of each side portion is plastically deformable in the second plane upon the steering column receiving an impact of predetermined magnitude sufficient to release the bracket member from the vehicle structure supporting the steering column. The other side rail of each side portion is sufficiently wide to withstand plastic deformation in the second plane, thereby providing a guide plane engaging the guide pin and maintaining the steering column in the axial alignment throughout the extent of any collapse of the steering column along the axis, and thereby precluding lateral displacement.

The invention further provides each side portion with a transition section which is, at the end nearest the base, decreased in thickness. The thickness decreases beginning at the one end of the slot constituting the point at which the guide pin passes through the slot to frictionally secure the bracket member to the vehicle structure to the end nearest the base. The steering column, upon receiving an impact of predetermined magnitude, will release the frictional engagement holding the bracket member and any further axial collapse of the steering column will result in the impact energy being absorbed substantially exclusively by plastic deformation of the support bracket side rail portions.

The objects, features, and advantages of the present invention including, but not limited to the aforementioned, are readily apparent from the following detailed description of the best mode for carrying out the invention when taken in connection with the accompanying drawings.

BEST MODE FOR CARRYING OUT THE INVENTION

Figure 1:
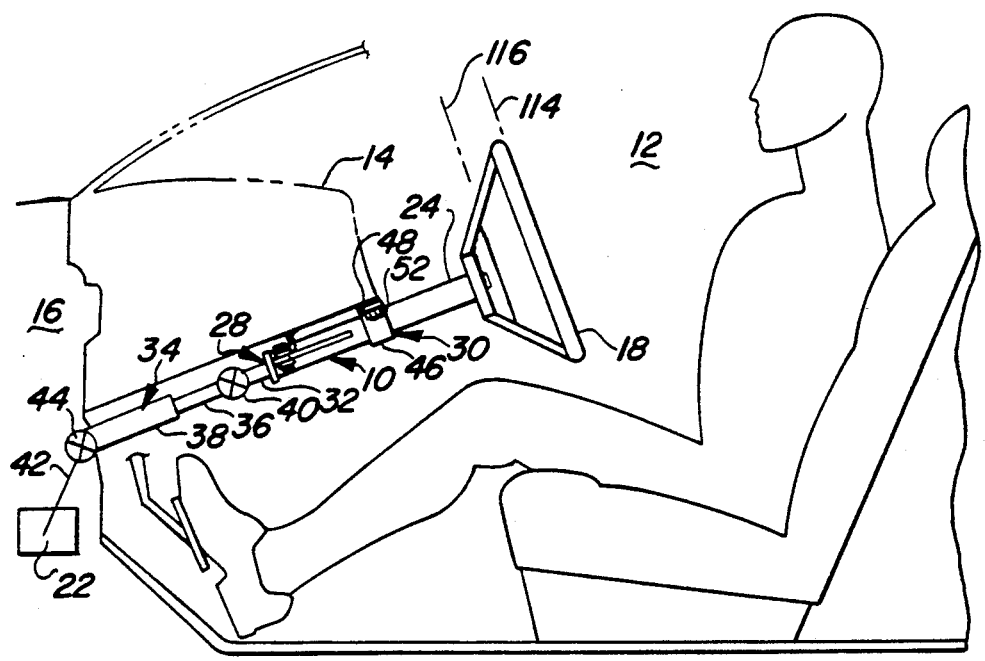
FIG. 1 is a side elevation view of the steering assembly in combination with a vehicle in accordance with the present invention.
Figure 2:
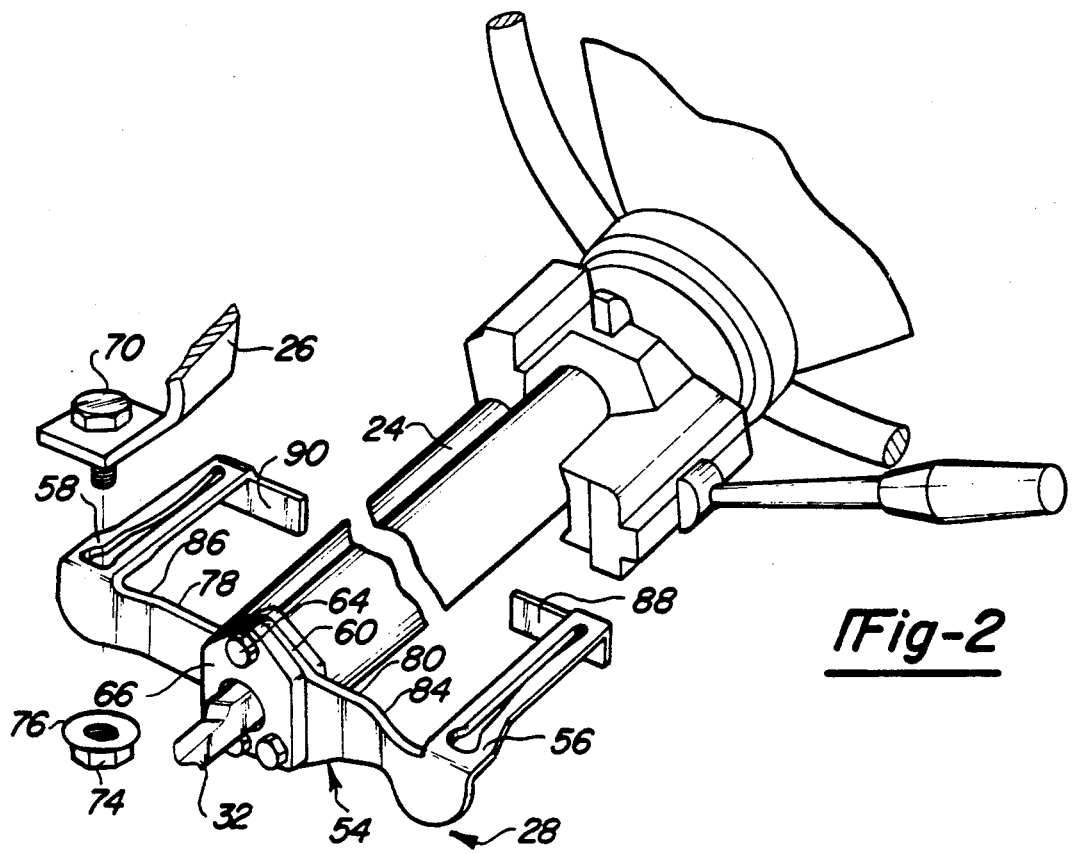
FIG. 2 is a partially exploded perspective view of the steering assembly in accordance with the present invention.

Basic features of the present invention are shown most clearly in FIGS. 1 and 2, wherein a collapsible steering column assembly generally designated 10 is shown mounted within an interior passenger compartment 12 of a vehicle. A dash panel 14 separates a frontal lower engine compartment 16 from the interior passenger compartment 12. A steering wheel 18 is attached to the rearward end of the collapsible steering column assembly which terminates at a steering gear box 22 within the engine compartment 16. The assembly 10 includes a steering column body 24 extending forward for a limited distance under the dash panel 14. It is secured to a support structure 26, shown in part in FIG. 2, at its forward end by a main support bracket 28, and at its rearward end by a secondary support bracket 30.

An upper steering shaft section 32 extends from the steering wheel 18 through the forward end of the steering column body 24 where it is coupled to a telescopically collapsing intermediate steering shaft 34 comprised of an inner steering shaft 36 concentrically mounted within an outer steering shaft section 38. The upper steering shaft section 32 is coupled to the intermediate steering shaft section 34 by means of a universal joint coupling shown diagrammatically at 40. The forward end of the intermediate steering shaft section 34 is coupled to a third steering shaft 42 by means of a universal joint diagrammatically shown at 44 which, in turn, is connected to the steering gear box 22.

The secondary support bracket 30 is constructed and operates in the manner as shown and described in U.S. Pat. No. 4,274,299 which is incorporated herein by reference. Briefly, it includes a U-shape bracket 46 which wraps around the bottom of the steering column body 24 and is bolted at its ends to the support structure 26. End flanges 48 of the U-shaped support bracket include shear clips or shear modules, as they are known, through which respective clamping bolts 52 pass. Upon impact of a predetermined magnitude, the shear modules which are held in place by the clamping bolts 52 will be sheared free of the U-shaped bracket 46 which then allows that the steering column body 24 is unrestrained by the U-shaped bracket 46 and may axially collapse.

For purposes of clarity, the secondary support bracket 30 has been omitted from the illustration of FIG. 2.

Figure 5:
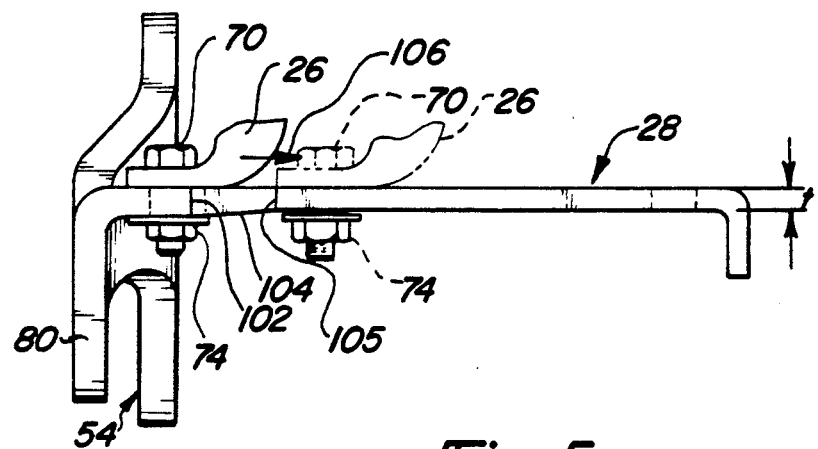
FIG. 5 is a side elevation view of the steering assembly main mounting bracket in accordance with the present invention.
Figure 4:
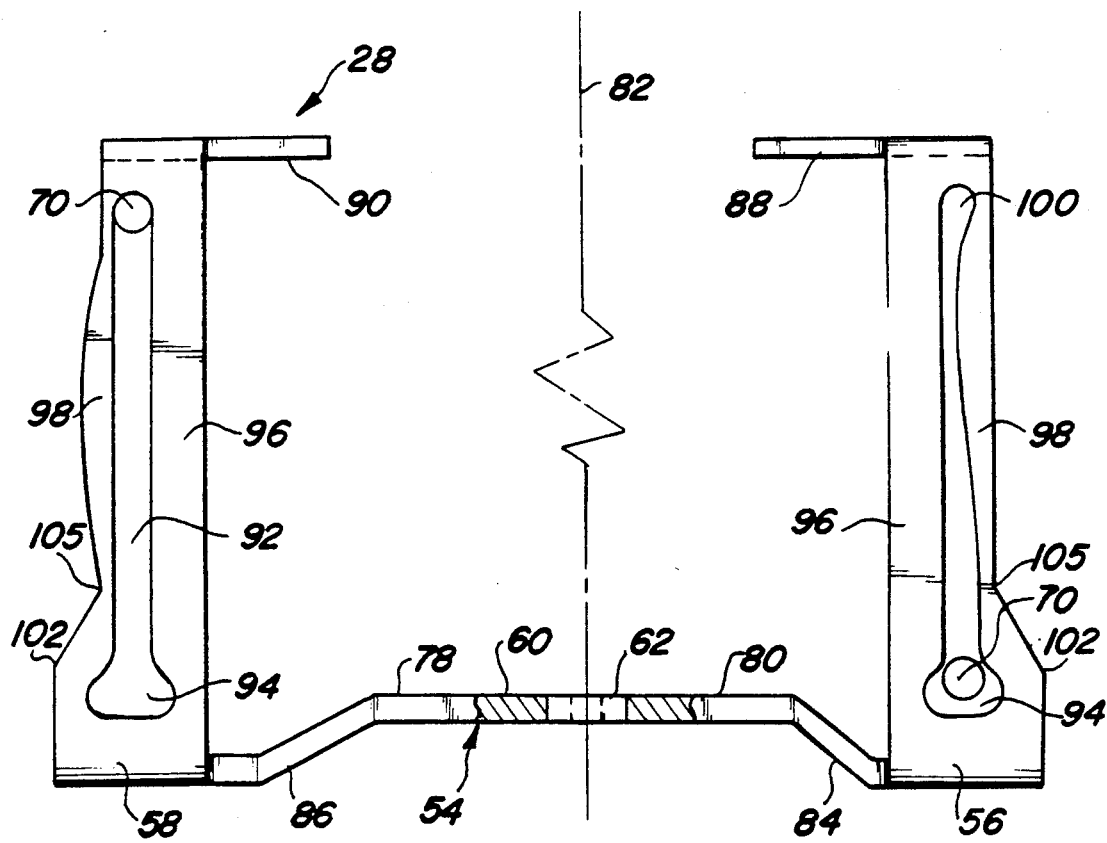
FIG. 4 is a plan view of the steering assembly main mounting bracket before and after impact in accordance with the present invention.

Looking particularly at FIGS. 2, 4 and 5, the main support bracket 28 is seen to be generally U-shaped in plan view and having a base portion 54 extending laterally of the axis of the steering shaft 32 and two side members 56,58 disposed on respective sides of the steering column.

The base portion includes a central hub 60 containing a bore 62 through which the steering shaft 32 passes. Arms 78,80 extend laterally outwardly from central hub 60 on both sides of the centerline 82. Each arm includes an intermediate section 84,86 formed at an angle relative to the remaining laterally extending portions of the arm 78,80. The axially extending side members 56,58 are formed at right angles with the base portion 54 generally in line with the axis of the steering column and terminating in a downwardly turned laterally inwardly extending rear stop plate members 88,90.

The support bracket 28 is affixed to the front end of the steering column body 24 by bolts 64 passing through an end cap 66, through the main support bracket 28, and threadably engaged with the front end of the steering column body 24. In turn, the main support bracket 28 is held to the vehicle support structure 26 by means of a threaded bolt 70 passing through a respective side member 56,58 and is frictionally held between the vehicle support structure 26 and a nut 74. The nut may include an integral washer 76, preferably of the domed-face type which provides a uniform clamping load.

Looking at the right hand side of the main support bracket 28 shown in FIG. 4, namely to the right of the centerline 82, the side member 56 is shown prior to any deformation caused by the axial displacement of the steering wheel assembly. The side member 56 includes a guide slot 92 extending its full length beginning with the forward end which includes an enlarged mounting hole 94. The guide slot 92 thereby divides the side member 56 into a side guide rail 96 located on a laterally inward side and an energy absorbing side rail 98 located at the laterally outward side. The guide slot 92 at all points other than at the mounting hole 94 is of a width less than the diameter of the threaded belt or guide pin 70. The side guide rail 96 is seen to be of significant width. However, the energy absorbing side rail 98 is of a minor width which varies along its length as determined by the amount of energy and rate of energy absorption which is desired. The guide slot terminates at a rearward end 100 which defines the full limit of travel of the main support bracket axially forward. This then defines the full length of axial collapse of the steering column assembly 10, subject to minor exceptions explained below.

As seen in FIG. 5, the thickness of side member 56 is non-uniform. At a point 102 just rearward of the threaded bolt 70, the thickness decreases along a tapered section 104 to a point 105 of minimum thickness (t) at its rearward end. The length of this tapered section 104 is known as the transition section.

Side member 58 is identically constructed.

In operation, the steering column assembly 10 is normally held rigidly to the vehicle support structure 26 by the threaded bolts 70 of the main support bracket 28 and the clamping bolts 52 of the secondary support bracket 30. Upon impact of the occupant with the steering wheel 18 such as may be caused during a front or rear end collision of the vehicle, the shear modules within the secondary support bracket 30 will shear from the secondary support bracket 30 thus releasing the steering column assembly 10 for axial displacement. Simultaneously, the friction clamping force generated by the mounting bolts 70 on the main support bracket 28 will be overcome again allowing axial displacement of the steering column assembly 10. Upon the slightest axial displacement, the frictional clamping force at mounting bolts 70 will be completely released as nuts 74 lose contact with the undersurface of the side members 56,58 and, relatively speaking, traverse the tapered transition section 104 in the direction of the arrow 106 as seen in FIG. 5. Upon continued axial displacement of the steering column, the main support bracket 28 will move forward relative to the threaded bolts 70. Since the threaded bolts 70 are larger in diameter than the width of the guide slots 92, the side rails 96 and 98 will tend to be displaced laterally. However, since the width of the side guide rail 96 is significantly greater than the energy absorbing side rail 98, it is only the energy absorbing rail 98 which will be deformed.

As shown in the left hand portion of FIG. 4, to the left of the centerline 82, as the threaded bolt 70 moves from its initial position to the rearward portion 100 of the guide slot 92, the energy absorbing side rail 98 will be deformed laterally outwardly with the section of minimum thickness acting as a hinge at point 105 since it is also of minimum width. As seen, the guide slot 92 will be deformed to a guide slot of uniform width throughout. The degree of energy absorbed, and the rate of energy absorbed, can be controlled by the relative width of the energy absorbing rail 98 at various points along its length. The configuration shown in FIG. 4 is just one of many which can be accommodated. The rate of energy absorption can be controlled so as to be constant or to vary from a high rate of energy absorption to a low rate of energy absorption, or vice versa, at any point along its length.

Figure 3:
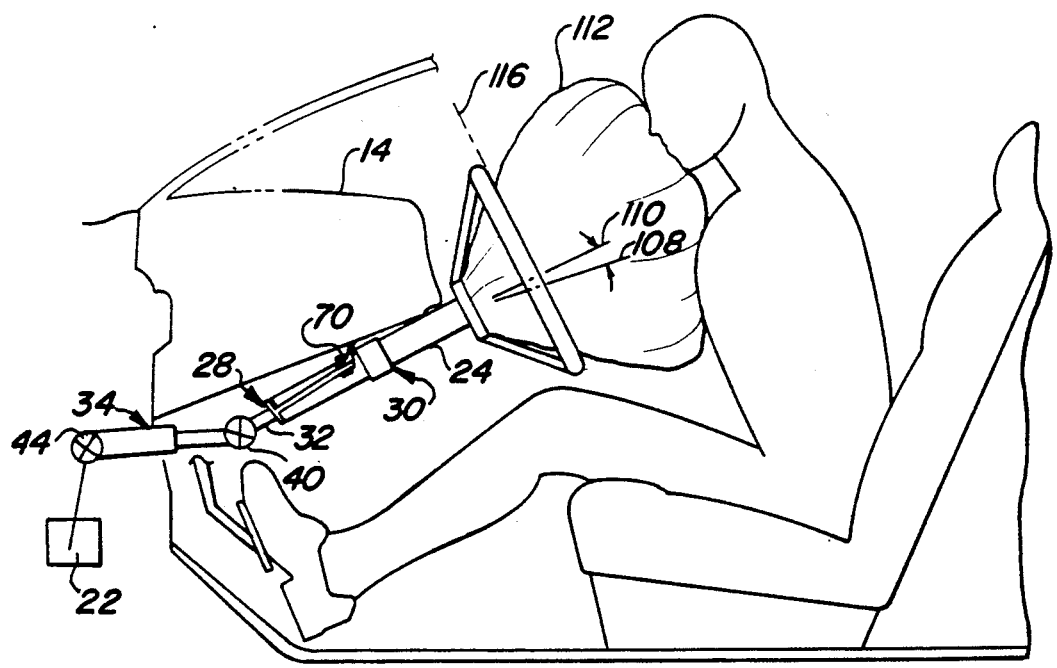
FIG. 3 is a side elevation view of the steering assembly in combination with a vehicle depicting the steering assembly at some point during its energy absorbing collapse following impact exceeding a predetermined magnitude in accordance with the present invention.

Further, as shown in FIG. 3, the main support bracket 28 allows a limited degree of vertical tilt to the steering wheel from its initial axis 108 to an inclined axis 110. As the steering wheel tilts vertically upwardly, the main support bracket 28 is designed to yield in bending deformation about a lateral axis as defined by the two respective threaded bolts 70 at whatever point along the respective guide slots 92 each may happen to be positioned at the time of the vertical impact load upon the steering wheel 18. The steering column assembly 10 may be equipped with an air bag 112 designed to expand instantaneously upon impact and cushion the occupant from direct contact with the steering column assembly 10. In any event, the steering column assembly 10 is adapted to accommodate axial displacement through a distance represented in FIG. 1 from initial point 114 to a fully collapsed point 116 which will be accompanied by telescopic collapse of the inner section 36 inside of outer section 36 of the intermediate steering shaft 34 and to accommodate vertical displacement of the steering wheel 18 accompanied by inclination of the steering column assembly at U-joints 40 and 44.

While the best mode for carrying out the invention has been described in detail, those familiar with the art to which this invention relates will recognize alternative designs and embodiments for practicing the invention. Thus, the above described preferred embodiment is intended to be illustrative of the invention which may be modified within the scope of the following appended claims.

I claim:

1. A vehicle energy absorbing steering column assembly, comprising:
   a steering column;
   a steering shaft rotatably supported within said steering column and adapted to receive a steering wheel at one end and to engage a steering gear mechanism at its other end;
   an energy absorbing main support member affixed to said steering column and adapted to support the steering column from a portion of the vehicle body;
   said main support member providing means for (i) allowing said steering column to collapse forwardly along a fixed axial path in the event of an impact of predetermined magnitude upon the steering wheel in the direction of the front of the vehicle, and (ii) absorbing the energy of such impact solely by plastic deformation of said support member;
   said main support member providing the sole support means for supporting said steering column beyond the point of any initial axial collapse of said steering column;
   said main support member being frictionally clamped to the vehicle dashboard support structure by a fastening means located at two points disposed laterally from one another on opposite sides of said steering column;
   said support member being released from frictional clamping engagement relative to the vehicle dashboard support structure substantially instantaneously upon receiving said impact of predetermined magnitude;
   said fastening means including a guide portion for guiding said support member along said fixed axial path throughout the axial collapse of said steering column;
   said fastening means providing an axis substantially perpendicular to said axial path and about which said support member may be plastically deformed to further absorb said impact;
   said main support member comprising a bracket having a base portion and two side portions disposed on opposite ends of said base portion;
   said base portion being disposed in a plane substantially perpendicular to the axis of said steering column and constituting a support for said steering column;
   said side portions being disposed in a plane substantially perpendicular to said base portion;
   each said side portion including a slot defined by oppositely disposed side rails;
   said slot being sufficiently wide at the end nearest said base to allow a guide pin to pass therethrough, the remainder of said slot being of a width less than said guide pin;
   one said side rail of each side portion being plastically deformable in said plane upon said steering column receiving an impact of predetermined magnitude sufficient to release said support member from the portion of the vehicle body supporting the steering column, whereby the energy of such impact may be absorbed in a controlled mode; and
   the other said side rail of each side portion being sufficiently wide to withstand plastic deformation in said plane, thereby providing a guide plane engaging said guide pin and maintaining said steering column in said axis throughout the extent of any collapse of said steering column along said axis.

2. The invention of claim 1, wherein each said side portion includes a transition section at the end thereof nearest said base portion, said transition portion decreasing in thickness beginning about at said base and the forward end of said slot, said forward end constituting the point at which the guide pin passes through said slot to frictionally clamp the support member between the guide pin and the vehicle body, whereby upon the steering column receiving said impact of predetermined magnitude, the frictional engagement holding the support member will be released as said impact causes said steering column assembly to axially collapse a first incremental distance and any further axial collapse of the steering column assembly will result in the impact energy being absorbed substantially exclusively by plastic deformation of the support member side rail portions.

3. The invention of claim 2 wherein each said slot includes a rearward end defining the full limit of axially forward travel of said support member.

4. The invention of claim 3 wherein said transition portion constitutes a minor portion of the total length of each said side rail, and the remainder of each said side rail being of substantially uniform thickness.

5. The invention of claim 4 wherein the width of the one said side rail of each side portion is non-uniform thereby providing a variable energy absorption rate dependent upon the axial extent of the steering column assembly collapse relative to the portion of the vehicle body from which it is supported.

6. The invention of claim 1 wherein said steering shaft comprises an upper portion, an intermediate portion and a lower portion;
   said lower portion being adapted to be coupled to the steering gear mechanism;
   said upper portion extending from the steering wheel through a forward end of said steering column and being coupled to said intermediate portion; and
   said intermediate portion having an inner steering shaft concentrically and telescopically received within an outer steering shaft, said inner steering shaft collapsing within said intermediate portion as said steering column axially collapses relative to the portion of the vehicle body to which it is supported.

7. A vehicle energy absorbing steering column assembly, comprising:
   a steering column;

a steering shaft rotatably supported within said steering column and adapted to receive a steering wheel at one end and to engage a steering gear mechanism at its other end;

an energy absorbing main support member affixed to said steering column and adapted to support the steering column from a portion of the vehicle body;

said main support member providing means for (i) allowing said steering column to collapse forwardly along a fixed axial path in the event of an impact of predetermined magnitude upon the steering wheel in the direction of the front of the vehicle, and (ii) absorbing the energy of such impact solely by plastic deformation of said support member;

said main support member providing the sole support means for supporting said steering column beyond the point of any initial axial collapse of said steering column;

said main support member being frictionally clamped to the vehicle dashboard support structure by a fastening means;

said support member being released from frictional clamping engagement relative to the vehicle dashboard support structure as provided by said fastening means substantially instantaneously upon receiving said impact of predetermined magnitude;

said fastening means including a guide portion for guiding said support member along said fixed axial path throughout the axial collapse of said steering column; and said fastening means providing an axis substantially perpendicular to said axial path and about which said support member may be plastically deformed to further absorb said impact.

8. The invention of claim 7 wherein said fastening means further includes a pair of shear clips laterally disposed on opposite sides of said steering column and fixed to said steering column body and clamp means extending through said shear clips and secured to the portion of the vehicle from which it is supported.

9. The invention of claim 7 wherein said main support member comprises a bracket having a base portion disposed in a plane substantially perpendicular to the axis of said steering column and constituting a support for said steering column;

an adjoining portion being disposed in a plane substantially perpendicular to said base portion;

said adjoining portion including a slot defined by oppositely disposed side rails;

said guide portion of said fastening means including a guide pin;

said slot being sufficiently wide at the end nearest said base portion to allow said guide pin to pass therethrough, the remainder of said slot being of a width less than said guide pin;

at least one said side rail of said adjoining portion being plastically deformable in said plane upon said steering column receiving an impact of predetermined magnitude sufficient to release said support member from the vehicle structure supporting the steering column, whereby the energy of such impact may be absorbed in a controlled mode.

10. In a vehicle steering column assembly, a support member for affixing a steering column in the vehicle structure, said support member comprising a generally U-shaped bracket, having a base portion and two side portions disposed on opposite ends of said base;

said base portion being disposed in a plane substantially perpendicular to the axis of said steering column and constituting a support for said steering column;

said side portions being disposed in a plane substantially perpendicular to said base portion;

each said side portion including a slot defined by oppositely disposed side rails;

said slot being sufficiently wide at the end nearest portion to allow a guide pin to pass therethrough, the remainder of said slot being of a width less than said pin;

one said side rail of each side portion being plastically deformable in said plane upon said steering column receiving an impact of predetermined magnitude sufficient to release said support member from the vehicle structure supporting the steering column, whereby the energy of such impact may be absorbed in a controlled mode; and the other said side rail of each side portion being sufficiently wide to withstand plastic deformation in said plane, thereby providing a guide plane engaging said guide pin and maintaining said steering column in said axis throughout the extent of any collapse of said steering column along said axis.

11. The invention of claim 10 wherein each said side portion includes a transition section at the end thereof nearest said base portion, said transition portion decreasing in thickness beginning about at said base and the forward end of said slot, said forward end constituting the point at which the guide pin passes through said slot to frictionally clamp the support member between the guide pin and the vehicle structure, whereby upon the steering column receiving said impact of predetermined magnitude, the frictional engagement holding the support member will be released as said impact causes said steering column assembly to axially collapse a first incremental distance and any further axial collapse of the steering column will result in the impact energy being absorbed substantially exclusively by plastic deformation of the support member side rail portions.

12. The invention of claim 11 wherein each said slot includes a rearward end defining the full limit of axially forward travel of said support member.

13. The invention of claim 12 wherein said transition portion constitutes a minor portion of the total length of each said side rail, and the remainder of each said side rail being of substantially uniform thickness.

14. The invention of claim 13 wherein the width of the one said side rail of each side portion is non-uniform thereby providing a variable energy absorption rate dependent upon the axial extent of the steering column assembly collapse relative to the support structure.

* * * * *

UNITED STATES PATENT AND TRADEMARK OFFICE
CERTIFICATE OF CORRECTION

PATENT NO. : 5,082,311

DATED : January 21, 1992

INVENTOR(S) : Joseph J. Melotik

It is certified that error appears in the above-identified patent and that said Letters Patent is hereby corrected as shown below:

On the Title page,

Abstract, line 6, delete "including" and substitute --includes--.

Abstract, line 16, delete "including" and substitute --includes--.

Abstract, line 22, delete "providing" and substitute --provides--.

Column 2, line 49, after "kind" insert a period (.) and delete the remainder of the sentence.

Column 3, line 68, after "column in" delete --the--.

Column 5, line 38, after "in" delete "a".

Column 6, line 18, after "18" insert a comma (,).

Column 7, line 8, delete "36" and substitute --38--.

Column 7, line 46, delete "dispose" and substitute --disposed--.

Column 7, line 49, before "support" insert --main--.

Column 7, line 55, before "support" insert --main--.

Column 7, line 60, before "support" insert --main--.

Column 8, line 12, before "support" insert --main--.

UNITED STATES PATENT AND TRADEMARK OFFICE
CERTIFICATE OF CORRECTION

PATENT NO. : 5,082,311

DATED : January 21, 1992

INVENTOR(S) : Joseph J. Melotik

It is certified that error appears in the above-identified patent and that said Letters Patent is hereby corrected as shown below:

Column 9, line 23, before "support" insert --main--.

Column 9, line 29, before "support" insert --main--.

Column 9, line 34, before "support" insert --main--.

Column 9, line 39, after "column" delete "body".

Column 9, line 60, before "support" insert --main--.

Column 10, line 16, after "nearest" insert --said base--.

Signed and Sealed this

Twenty-fifth Day of May, 1993

Attest:

MICHAEL K. KIRK

*Attesting Officer*   *Acting Commissioner of Patents and Trademarks*